Figure 1:
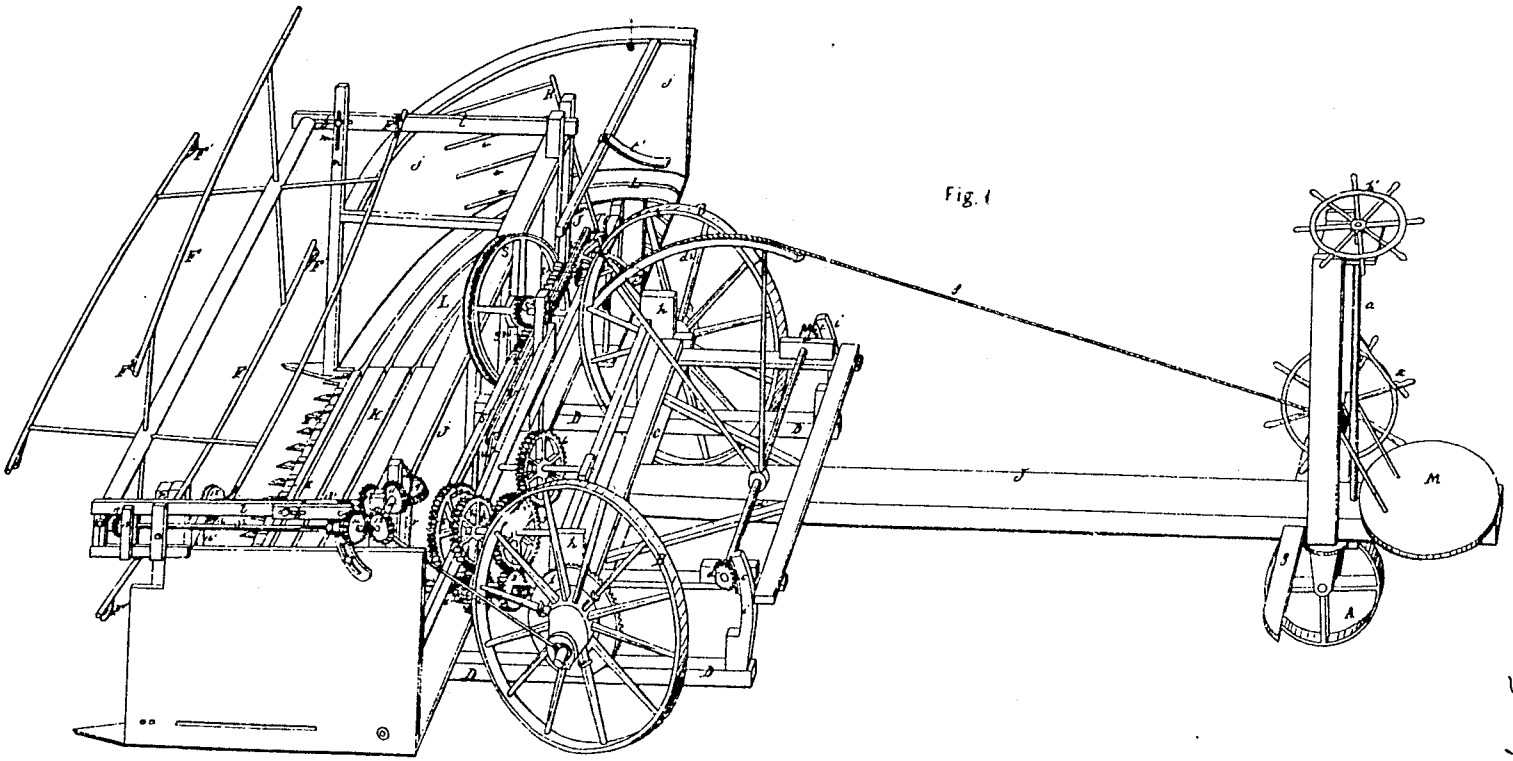

Sheet 1 - 2 Sheets

N. Platt.

Harvester Rake.

No 265

Reissued May 23, 1854.

N. Platt.
Harvester Rake.
No 265 Reissued May 23, 1854.
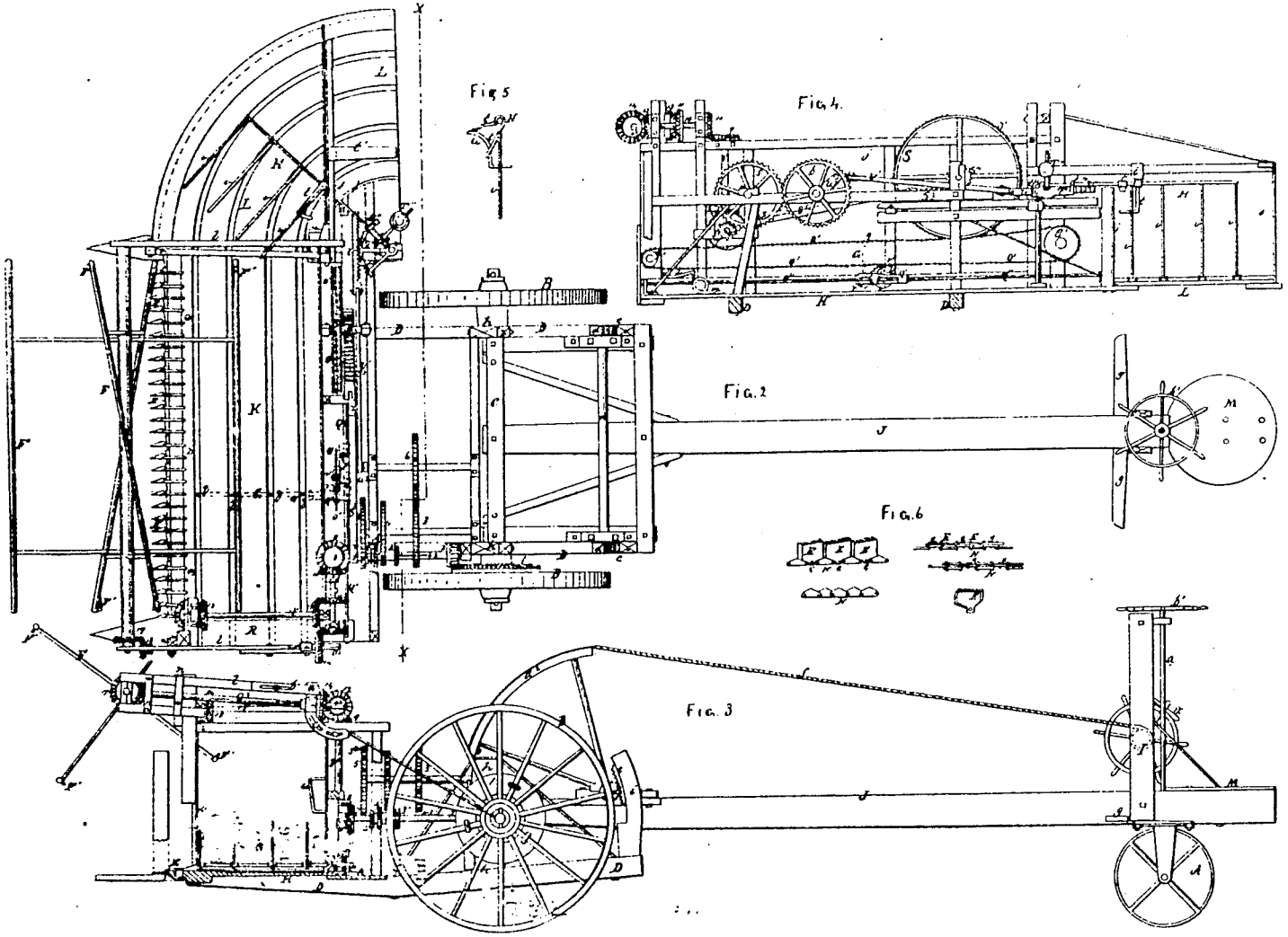

BEST AVAILABLE COPY

UNITED STATES PATENT OFFICE.

NELSON PLATT, OF OTTAWA, ILLINOIS, ASSIGNOR TO W. H. SEYMOUR AND D. S. MORGAN, OF BROCKPORT, NEW YORK.

IMPROVEMENT IN HARVESTERS.

Specification forming part of Letters Patent No. 6,517, dated June 12, 1849; Reissue No. 265, dated May 23, 1854.

*To all whom it may concern:*

Be it known that NELSON PLATT, formerly of Ottawa, in the county of La Salle and State of Illinois, late of Kendall county, in the same State, but now believed to be absent from the United States, and, if alive, on a voyage to the Pacific Ocean, assignor to WILLIAM H. SEYMOUR and DAYTON S. MORGAN, of Brockport, in the county of Monroe and State of New York, did invent a certain Improvement in Machines for Cutting and Raking Grain or Grass, of which the following is a full, clear, and exact description, reference being had to the annexed drawings, which make part of this specification, and in which—

Figure 1 represents a view in perspective of a machine embracing the improvements. Fig. 2 represents a top view of the same. Fig. 3 represents a side elevation, a portion of the frame being removed to expose the rake and cutter. Fig. 4 represents a sectional view taken through the line *x x* of Fig. 2. Fig. 5 represents a view of the guide and arms detached from the machine, by which the oscillating rake is turned down to take the grain and carry it off the platform; and Fig. 6 represents views of a portion of the chain and cutters in various positions.

The machine, as represented in the accompanying drawings, runs upon three wheels, the hind-most, A, of which is hung upon a pivot or vertical shaft, *a*, which is turned like a rudder by the attendant to direct the course of the machine when in motion. The other or front wh[illegible] B, are secured in the usual manner up[illegible] opposite ends of an axle, C, upon which [illegible] D is suspended, together with the [illegible] the cutters E, reel F, first rake, G, [illegible] rake, H, with the mechanism re[illegible]perate them severally.

[illegible] purpose of elevating and depressing [illegible] cutters to adapt them to cutting off the grain at different heights from the ground, the frame D is raised and lowered upon the axle C, which serves as its fulcrum, by means of the segment-racks *c* and pinions *d*, the former attached to the back end of the frame D and the latter to the beam J. The pinions *d* are secured on the ends of the rock-shaft *d'*, which is turned by the quadrant-lever $d^2$, and the latter is operated by a cord, rope, or chain, *f*, which is wound up and let out by the windlass I, to which it is attached.

The windlass is provided with a pawl or stop, *x*, to hold it in any position at which it may be necessary to place it in the adjustment of the cutters, or for the purpose of holding up the cutters to pass over obstructions with which they might otherwise come into contact in moving from one place to another.

The horses or other animals employed to propel this machine are harnessed to a whiffletree, *g*, attached to the beam J, on either side of which they travel. The beam J connects the wheels A and B B and supports the steering apparatus as well as the attendant, who guides the machine and drives the team which draws it.

The swing-frame consists of two principal beams, D D, suspended to the axle C by arms *h h* projecting from their upper side, and braced so as to give them the requisite firmness and strength. Upon the rear ends of these beams studs *i* are erected, to which the racks *c* are secured. Upon the front end of these beams D a double platform, K, is placed, within which an endless-chain cutter and the first rake are arranged and operate. These beams also support the side or curved portion, L, of the platform K, along which the grain is conveyed by the second rake, H, to the side of the machine and discharged.

Upon the platform K is placed the frame for supporting the reel F and the wheels and shafts which operate it, also the frame for supporting the gearing which operate the rakes, and the guards or partitions *j* to prevent the grain from falling off the platform or from getting entangled in the machinery.

The object for which the reel F is used is the same as that for which it is used by others—viz., pressing the grain against the cutters, and turning it when cut over upon the platform; and as it requires to be elevated and set back for long grain and depressed and moved forward for short grain, in order that they may be respectively cut to the best advantage, provision is made for varying its position as may be required by making slots *b* in the horizontal bars *l*, to which the bearings in which the axis of the reel rests and are secured, and

BEST AVAILABLE COPY also by making slots $m$ in the posts $n$ for the bolts to pass through which support the horizontal bars.

The horizontal shaft $O^2$, upon which the wheels are mounted that turn the reel, slides through the hollow axis of the wheel 14, which drives it, and has a longitudinal groove in its side, into which a stud in the eye of the wheel projects to turn it. The object of this sliding connection of the shaft and wheel is to prevent derangement of the driving-gear when the reel is moved in or out for the purpose of adjustment. The vanes of the reel are placed obliquely to its axis for the purpose of bringing the grain more gradually into contact with the cutters, and also to press it obliquely against them in a direction contrary to their motion and the inclinations of the indentations formed in the edge, which is found in practice greatly to facilitate the cutting. The grain has a tendency to slip past the hindmost end of the vanes in consequence of their inclination, and thus escape being cut, and to prevent the loss of grain and defect in the performance of the machine thus occasioned a wedge or hook, F′, is placed upon the end of each vane in the plane of its motion, which prevents the grain from slipping over it.

The cutter consists of a series of short sections, E, of uniform shape, each corresponding in length with the links of an endless chain, N, to which they are secured by means of a screw-bolt, $e$, or otherwise. By this arrangement each tooth can very readily be removed, to be either sharpened, repaired, or replaced by another, and as the cutters form no part of the chain, but are merely carried by it, they are not subjected to the strains to which they would be if they formed the links of a chain. The chain N and sectional cutters E are respectively formed as represented in Fig. 6, each section being narrowest at the end which goes forward, in order that the grain or grass may be the more readily seized and cut off. The edges of the cutters are serrated in the manner of a sickle, and have one end sharpened in order that it may cut off any straw, grass, or other obstruction intervening between it and the plane surface of the adjacent end of the next section. This feature is deemed of much importance, because it renders the links capable of freeing themselves of straw and grass, which otherwise would choke and thus render them liable to break. The chain, with its cutters, is stretched round a pulley and a cog-wheel, the teeth of which take into the interstices between the links, so that when the cog-wheel revolves it carries the chain with it at its own velocity. This wheel and pulley are secured upon vertical axes, which turn in suitable bearings attached to the platform or frame. A groove is formed between the upper and under surface of the platform for the chain to run in, to keep it in the proper position and prevent its yielding to the pressure exerted by the grass or grain against the cutters.

It is contemplated making the edges of the sectional cutters either smooth or serrated, and also so forming them that when the chain is in a straight line they will either form a straight or an indented edge, as the particular circumstances of the case may render advisable. It may also be found advisable to place the sections at some distance apart, instead of arranging them near each other.

The part K of the platform immediately behind the cutter is double, the upper portion having slots in it for the teeth $q$ of the first or chain rake to pass through, the head of the rake moving in the space between the top and bottom part of the platform.

The rake-head Q is placed in a sliding stock, Q′, which runs backward and forward on a guide-rod, Q″. The end of the rake-head on the inside of the stock has a pinion, $r$, or a segment of one secured upon it, into which a quadrant-rack, $r'$, takes, which has an arm, $r''$, that turns with the quadrant $r'$ on the sliding stock Q′, the arm and quadrant being so arranged that the chains O′, which draw the stock and the rake backward and forward, will turn the pinion $r$ each time the motion of the rake is reversed through an angle of ninety degrees, so as to change the teeth of the rake from a vertical to a horizontal position, and vice versa. The teeth $q$ stand upright to carry the grain off the platform K and deliver it to the sweep-rake H, and are then turned down again to pass back within the platform to its opposite end, to be ready again to be moved forward to rake off the cut grain. These alternations of this rake are produced by the two chains O′. One end of each is attached to the lever $r'$, and the other, after being passed over the pulleys S′, is secured to the periphery of the flanged drum S, which is alternated by a rack, $S^3$, that takes into a pinion, $S^4$, upon its axis.

The rack $S^3$ is alternated by a pitman, $S^5$, which is moved by a crank-pin, $s$, secured upon the face of the driving-wheel 5.

When the rake has been moved to the extreme left, looking toward the front of the machine, the teeth pass beneath a cover or box, R, at the end of the platform, so that as they rise through slots in this cover to a vertical position a portion of the grain will be lifted by them. The resistance of the grain to the rising of the rake-teeth tends to prevent them from rising upright. To counteract the tendency to prevent the teeth from rising, a spring, Z, is arranged in such manner that it shall bear upon the rake-stock Q′ with a force sufficient to hold it from moving on the rod Q″ until the quadrant-rack $r'$ has turned the pinion $r$ to bring the teeth of the rake into an upright position. The turning of the quadrant-rack $r'$ is arrested when the rake-teeth $q$ are turned up or down by stop-pins 2′ 2′, projecting from its side, that strike upon the sliding stock Q′.

The second or sweep rake, H, is attached by one end of its head to a cogged quadrant, T, in such a manner that its head may be turned on its own axis to vary the inclination of the teeth at the same time that it is swung through the arc of vibration of the quadrant to carry the grain received from the first or chain rake over the curved part of the platform and deposit it behind the latter upon the ground.

In order that the teeth $v$ may be carried over and placed behind the grain or grass to be swept off the platform by it, they are turned into a horizontal position while moving backward by a weighted lever, T″, in which position they remain until carried behind the grain to be removed by them, when the bent arms $t$ $t$ on the inner end of the head, coming against a fixed catch or guide, $u$, Figs. 2 and 5, turn the teeth down again into a vertical position. The motion of the quadrant is now reversed and engages an arm, T‴, with a catch, $t''$, which holds up the weighted lever, keeping the rake vertical until it has swept over the curved part of the platform and discharged the grain. The quadrant T is again reversed to bring the rake-head back, the spring $t'$ offering sufficient resistance to the return of the rake to disengage the arm T‴ from the catch $t''$, when the weighted lever, by its gravity, immediately turns up the teeth again into the horizontal position, to prepare them for a repetition of the operation just described. The slot or staple $t^4$ only permits the quadrant to move far enough to disengage the catch T‴ before it begins to carry the rake-head forward again. The quadrant T gears into and is alternated by the rack V, which is moved by the pitman V′, the latter receiving its motion from a crank, $u^2$, on the shaft of the wheel 6.

Motion is communicated to the cutter, reel, and rakes from one of the wheels B, which has a cog-wheel, 1, secured to it in any suitable manner, which gears into a pinion, 2, mounted upon the principal driving-shaft, $v^2$, upon which are placed three pinions of unequal size on a sleeve which is common to all, and slides upon the shaft $v^2$, so that any one of the pinions may be placed into gear with that one of the wheels 3, 4, and 5 upon the second driving-shaft with which it matches. The front wheel, 3, upon the second driving-shaft gears into and drives the wheel 6 and the third driving-shaft, upon which it is mounted. Upon the end of this last shaft is placed a crank, $u^2$, which operates the pitman U′, that turns the sweep-rake, which crank is so placed as to bring this rake into the proper position to take the grain brought forward by the first rake immediately after it has been deposited by it upon the circular part of the platform. Upon the front end of the first driving-shaft, $v^2$, a bevel-wheel, 7, is placed, which takes into a similar wheel, 8, and drives the upright shaft 8′, upon which it is mounted. Upon the upper end of the last shaft another bevel-wheel, 9, is placed, which gears into and drives a like wheel, 10, which drives the shaft 10′, upon which it is mounted, and the two wheels 11 and 12, which are also mounted upon the same. One of the wheels, 11, gears into the wheel 13, which is secured to and drives the shaft 13′, upon the opposite end of which is a bevel-wheel, 15, which takes into and drives the wheel 16, which is mounted upon and drives the vertical shaft 16′, upon the lower end of which is secured the driving-wheel of the endless chain, to which the cutters are attached. The other wheel, 12, mounted upon the shaft 10′, takes into the wheel 14, whose axis is hollow, and is mounted upon the shaft $O^2$, which it drives. The other end of this shaft carries the wheel 18, which gears into and drives the wheel 19, mounted upon the end of the axis of the reel, and drives the same. The cone of pinions 3′ 4′ 5′ and wheels 3 4 5 are for the purpose of varying the frequency of the alternations of the rakes, so as to make the sheaves of a size corresponding to the growth of the grain.

The train of wheels above described, as well as the other devices employed to give to the cutter, reel, and rakes severally their requisite movements, may be constructed and arranged as represented and in various other ways well known to the machinist, and which do not therefore require a particular description. These motions may also be produced by belts, or chains and pulleys, instead of cog geared, if the same should be thought preferable by the constructer. The several parts of the apparatus may be made of such materials as it is deemed by the constructer to be the best to employ.

The operation is as follows: The horses being attached to the beam J and the several parts properly adjusted, the conductor mounts the platform M, and, starting the team, the machine advances, and he guides it by means of the steering hand-wheel $b'$, by which the direction of the wheel A can be changed so far as to turn the machine entirely round within a very short space. The reel presses the standing grain back against the cutters, which cut it off, letting it fall upon the platform, whence it is taken by the rakes, which remove it with such frequency that the quantity swept off each time will make a sheaf of suitable size. The stalks of grain, as they fall upon the platform, lie parallel to the direction in which the machine travels and to the swath; but by the operation of the sweep-rake the grain is turned, so that when discharged its stalks lie at right angles, or thereabout, to the general direction of the swath and path of the machine.

What is claimed as the invention of the said NELSON PLATT is—

1. The combination of a series of removable cutters with the links of an endless revolving chain, which carries them successively into contact with the grain or grass to be cut, substially as herein described, whether the cutters be contiguous or placed at intervals upon the chain.

2. Making one end of each cutter sharp, in order that by pressing against the adjacent end of the next cutter straw, grass, or other intervening obstructions may be cut in two and allowed to pass out, the cutters thus freeing themselves from obstructions which otherwise might either choke or break them.

3. Making the cutters narrower at one end than the other, so that as they are carried forward by the chain in a straight line they may present a series of inclined cutting-edges, against which the stalks of grain or grass are pressed by the reel or the progress of the machine until severed, by which arrangement of the cutting-edges their efficiency is greatly increased.

4. The employment of a sweep or turning rake for the purpose of sweeping the grain off the platform in such manner as to deposit it upon the ground with its stalks at right angles, or thereabout, to the path of the machine.

5. The method of vibrating a sweep-rake, H, and turning its teeth, as herein set forth, so as to pass over the grain and to seize and sweep it off the platform, whether the devices employed to effect these movements be such as described or others equivalent thereto.

6. The method of holding a sweep-rake firmly, with its teeth at the proper distance above the platform, by a latch or the equivalent thereof, which, operating with a greater certainty than a weight, spring, or other fastening not rigid, more effectually prevents the rake-teeth from rising, so as to override the grain, and at the same time avoids the necessity of moving a heavy weight or overcoming the tension of a strong spring in elevating the rake preparatory to its retrograde stroke.

7. The construction and arrangement of a sweep-rake and the mechanism for operating it in such manner that it is carried back and forth and raised and lowered without support at the outer end, thereby rendering it less liable to become entangled with the grain and clogged or broken.

8. The method of changing the frequency of the alternations of the rake or other device for discharging the grain by means of the wheels 3 4 5 and pinions 3′ 4′ 5′, or other equivalent devices for producing a differential movement, for the purpose of varying the size of the sheaves, as may be required, substantially as set forth.

WM. H. SEYMOUR.
DAYTON S. MORGAN.

Witnesses:
GEO. H. ALLEN,
JAMES ROBY.